US012269142B2

(12) United States Patent
Kovacs et al.

(10) Patent No.: US 12,269,142 B2
(45) Date of Patent: Apr. 8, 2025

(54) GRINDING OR DISC CUTTING-TYPE HAND-HELD TOOL

(71) Applicant: ETABLISSEMENTS GEORGES RENAULT, Saint Herblain (FR)

(72) Inventors: Peter Kovacs, Nantes (FR); Vincent Arnaud, Mouzillon (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 0 days.

(21) Appl. No.: 18/259,647

(22) PCT Filed: Dec. 23, 2021

(86) PCT No.: PCT/EP2021/087592
§ 371 (c)(1),
(2) Date: Jun. 28, 2023

(87) PCT Pub. No.: WO2022/144316
PCT Pub. Date: Jul. 7, 2022

(65) Prior Publication Data

US 2024/0091903 A1 Mar. 21, 2024

(30) Foreign Application Priority Data

Dec. 29, 2020 (FR) ...................................... 2014204

(51) Int. Cl.
*B24B 45/00* (2006.01)
*B24B 23/02* (2006.01)
*B25F 3/00* (2006.01)

(52) U.S. Cl.
CPC .......... *B24B 45/006* (2013.01); *B24B 23/022* (2013.01); *B24B 23/028* (2013.01); *B25F 3/00* (2013.01)

(58) Field of Classification Search
CPC ... B24B 45/006; B24B 23/022; B24B 23/028; B24B 23/04; B24B 45/00; B24B 23/00;
(Continued)

(56) References Cited

U.S. PATENT DOCUMENTS 6,148,526 A 11/2000 Kirn et al.
2013/0193655 A1* 8/2013 Kaye, Jr. .................. B27B 5/32
279/141

FOREIGN PATENT DOCUMENTS

DE 19512705 A1 * 10/1996 ............ B24B 45/00
GB 2283191 A 4/1995
(Continued)

OTHER PUBLICATIONS

Gallemaers et al., DE 19512705 C2, Feb. 1997 (Year: 2024).*
(Continued)

*Primary Examiner* — Veronica Martin
(74) *Attorney, Agent, or Firm* — David D. Brush; Westman, Champlin & Koehler, P.A.

(57) ABSTRACT

A grinding or disc cutting-type hand-held tool including: a casing housing a motor and an output shaft rotated by the motor along an axis of rotation. The output shaft is capable of rotating: a first type of accessory having a threaded central opening; and a second type of accessory having a smooth central opening. The output shaft has: an end portion supporting a first connection element for rigidly connecting the first type of accessory; and an intermediate portion supporting a second connection element for rigidly connecting the second type of accessory.

9 Claims, 7 Drawing Sheets

(58) Field of Classification Search
CPC ....... B24B 23/02; B24B 55/052; B24B 27/08; B24B 45/003; B24B 55/05; B24B 55/10; B24B 9/00
See application file for complete search history.

(56) References Cited

FOREIGN PATENT DOCUMENTS

| | | | |
|---|---|---|---|
| WO | 9823410 | A1 | 6/1998 |
| WO | 2008088925 | A2 | 7/2008 |

OTHER PUBLICATIONS

English translation of the Written Opinion of the International Searching Authority dated Apr. 7, 2022 for corresponding International Application No. PCT/EP2021/087592, filed Dec. 23, 2021.
International Search Report dated Apr. 7, 2022 for corresponding International Application No. PCT/EP2021/087592, filed Dec. 23, 2021.
Written Opinion of the International Searching Authority dated Apr. 7, 2022 for corresponding International Application No. PCT/EP2021/087592, filed Dec. 23, 2021.

* cited by examiner

GRINDING OR DISC CUTTING-TYPE HAND-HELD TOOL

CROSS-REFERENCE TO RELATED APPLICATIONS

This Application is a Section 371 National Stage Application of International Application No. PCT/EP2021/087592, filed Dec. 23, 2021, which is incorporated by reference in its entirety and published as WO 2022/144316 A1 on Jul. 7, 2022, not in English.

1. FIELD OF THE INVENTION

The field of the invention is that of hand-held tools.

More specifically, the invention relates to grinding or disc cutting-type hand-held tools intended to be used with several types of accessories.

Such hand-held tools can in particular be used in an industrial environment or by individuals.

2. PRIOR ART

Hand-held tools, such as grinders or disc cutters, are commonly used by operators or individuals for removing material.

Such tools conventionally comprise a casing housing a motor provided with a rotor connected to an output shaft by means of a gear, for example a bevel gear, and capable of rotating an accessory. Such accessories are conventionally substantially circular in shape and have a central opening. This accessory can be a material-removing disc, in particular a grinding, cutting or sanding disc.

This accessory can be attached to the output shaft of the tool by threaded clamping means. To this end, the accessory incorporates a threaded or smooth, blind opening or through-opening in the center thereof, allowing a clamping means to be implemented.

However, different standards exist, defining the geometry of this opening such that the tools are designed to specifically adapt to one standard or another.

This has the drawback of requiring the operator to have as many tools as there are standards, which is both costly and cumbersome.

Moreover, this can be problematic for the operator if one or more parts required to perform his/her task are lost.

There is thus a need to improve such hand-held tools to make them compatible with multiple standards.

One of the particular aims of the invention is to address this need and to at least partially overcome the drawbacks of the prior art.

3. DESCRIPTION OF THE INVENTION

The invention addresses this need by proposing a grinding or disc cutting-type hand-held tool, comprising:

- a casing housing a motor;
- an output shaft rotated by said motor along an axis of rotation.

According to the invention, said output shaft is capable of rotating:

- a first type of accessory having a threaded central opening,
- a second type of accessory having a smooth central opening, said output shaft having:

- an end portion supporting first means for rigidly connecting said first type of accessory;
- an intermediate portion supporting second means for rigidly connecting said second type of accessory.

The invention thus proposes a novel and inventive approach to at least partially overcome some of the drawbacks of the prior art.

In particular, the proposed invention simplifies use thereof and limits the costs required for the implementation thereof in different uses. More specifically, the same output shaft can receive several types of accessories, which avoids many tooling costs.

In order to use a new accessory standard, the old accessory is simply removed and the new accessory is mounted, with, where necessary, one or more adapter-forming parts, but without having to remove and replace the whole assembly rotating the accessory.

According to one feature of at least one embodiment of the invention, the end portion has a cylindrical profile formed along the axis and provided with an external thread forming said first means for rigidly connecting, said first means for rigidly connecting being capable of cooperating with said threaded central opening of said first type of accessory.

According to one feature of at least one embodiment of the invention, said end portion has a threaded hole. Moreover, said hand-held tool further comprises a locking screw capable of cooperating with said threaded hole so as to hold said first type of accessory against said output shaft.

According to one feature of at least one embodiment of the invention, the second means for rigidly connecting comprise a shoulder extending around the periphery of said intermediate portion.

According to one feature of at least one embodiment of the invention, the hand-held tool comprises a first flange formed around said intermediate portion and bearing against said shoulder. It further comprises a second flange formed around said intermediate portion and housed between said first flange and said intermediate portion, said first flange and said second flange being configured to clamp said second type of accessory so as to keep said second type of accessory linked to said output shaft.

According to one feature of at least one embodiment of the invention, said first flange has a first crenelated end, the second means for rigidly connecting further comprising first toothings formed on the periphery of said intermediate portion and capable of cooperating with said first crenelated end so as to form indexing means for said first flange, said first toothings being formed in the continuation of said shoulder and extending in the direction of said axis of rotation.

According to one feature of at least one embodiment of the invention, said second flange has a second crenelated end, the second means for rigidly connecting further comprising second toothings formed on the periphery of said intermediate portion and capable of cooperating with said second crenelated end so as to form indexing means for said second flange, said second toothings being formed in the continuation of said first toothings and extending in the direction of said axis of rotation.

According to one feature of at least one embodiment of the invention, said first flange has, opposite said first crenelated end, a projection extending along an axis substantially orthogonal to the axis of rotation so as to hold said second type of accessory against said second flange.

According to one feature of at least one embodiment of the invention, said second flange has, opposite said second crenelated end, a projection extending along an axis substantially orthogonal to the axis of rotation so as to hold said second type of accessory against said first flange.

According to one feature of at least one embodiment of the invention, said end portion has a threaded hole, and said hand-held tool further comprises a locking screw capable of cooperating with said threaded hole so as to keep said second type of accessory pressed between said first flange and said second flange.

According to one feature of at least one embodiment of the invention, said hand-held tool is of the pneumatic or electric type.

4. DESCRIPTION OF THE FIGURES

Further features and advantages of the invention will become apparent on reading the following description of specific embodiments, which is given merely as a non-limiting example for illustration purposes, and the accompanying drawings, in which.

5. DESCRIPTION OF SPECIFIC EMBODIMENTS

The general principle of the invention is based on the implementation of a hand-held tool comprising an output shaft capable of driving a first type of accessory having a threaded central opening and a second type of accessory having a smooth central opening. It should be noted that, according to the invention, the hand-held tool is of the pneumatic or electric type.

It can in particular be of the grinding or disc cutting type. Alternatively, it can also be of the sanding type.

Figure 1:
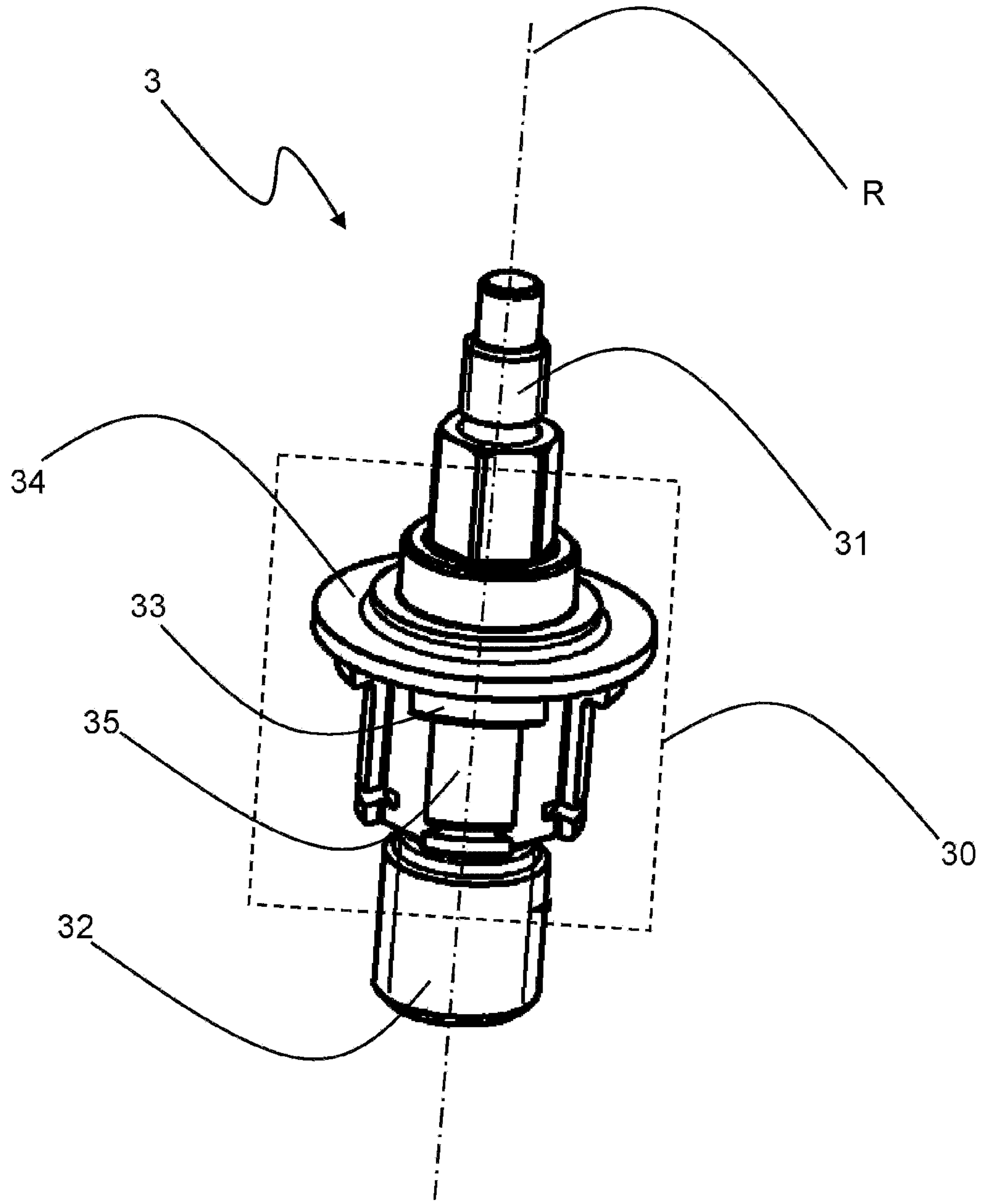
FIG. 1 shows a perspective view of an output shaft according to a preferred embodiment of the invention.
Figure 2:
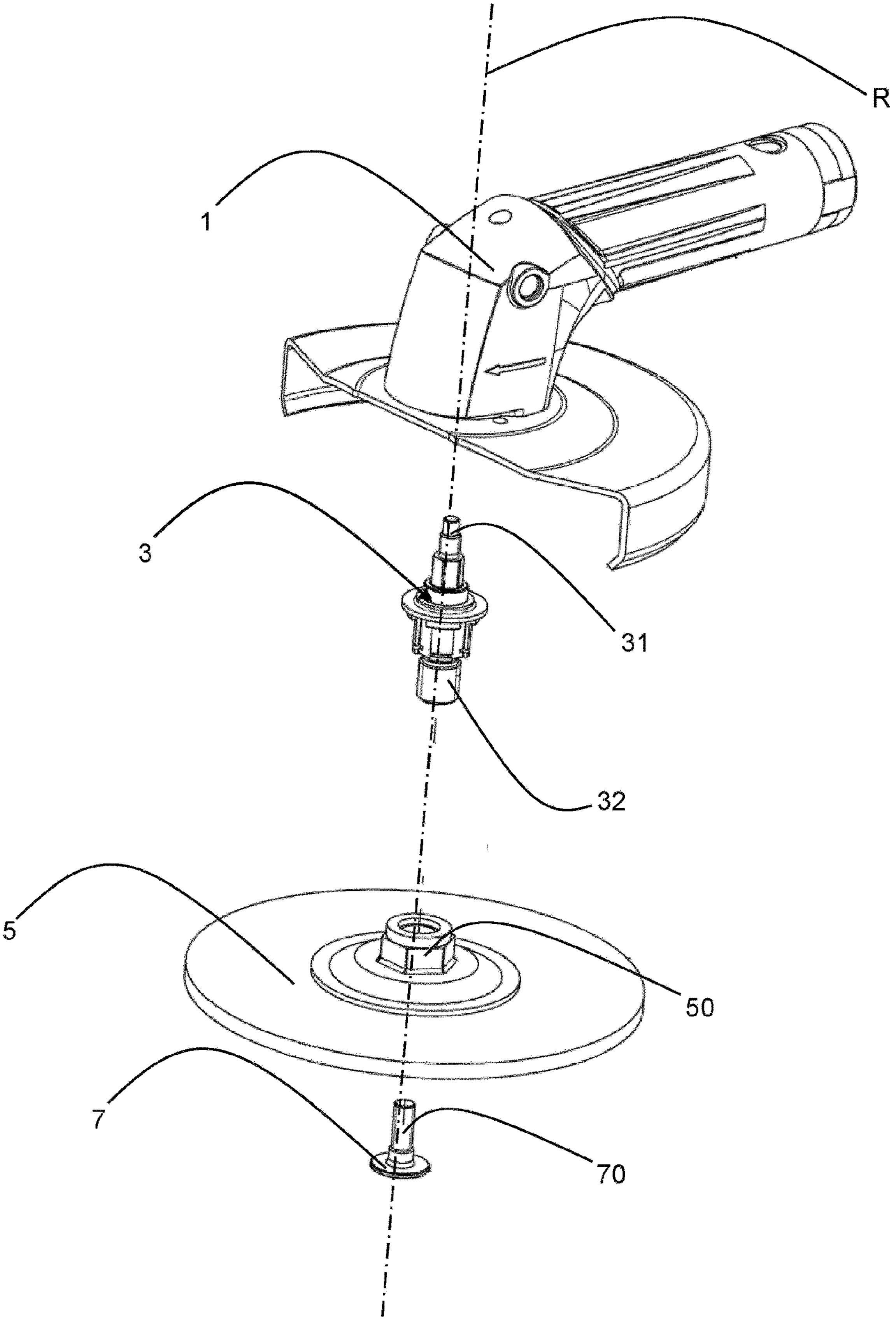
FIG. 2 shows a perspective view of a hand-held tool according to a first embodiment of the invention.
Figure 3:
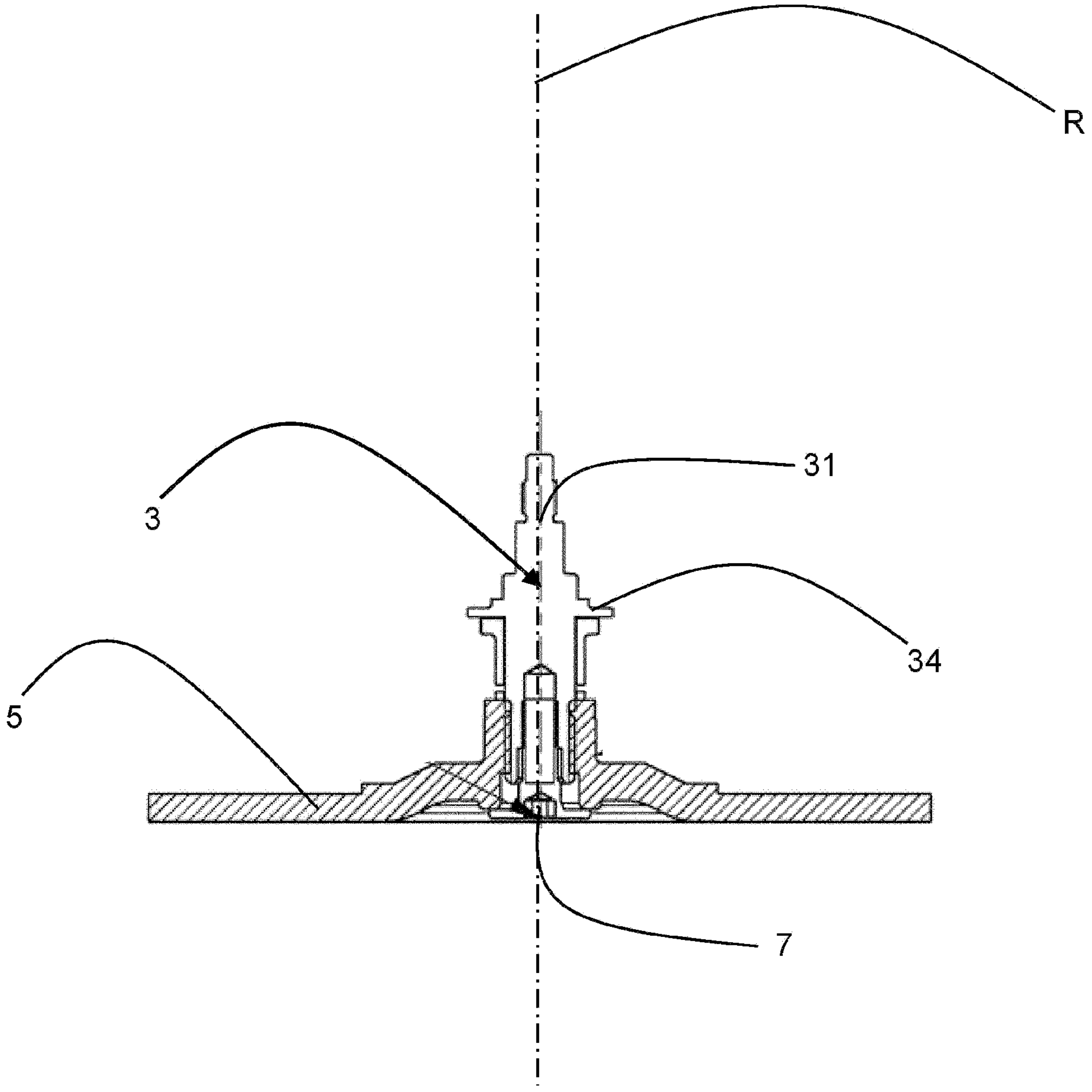
FIG. 3 shows a partial, lateral sectional view of a hand-held tool according to the embodiment in FIG. 2.
Figure 4:
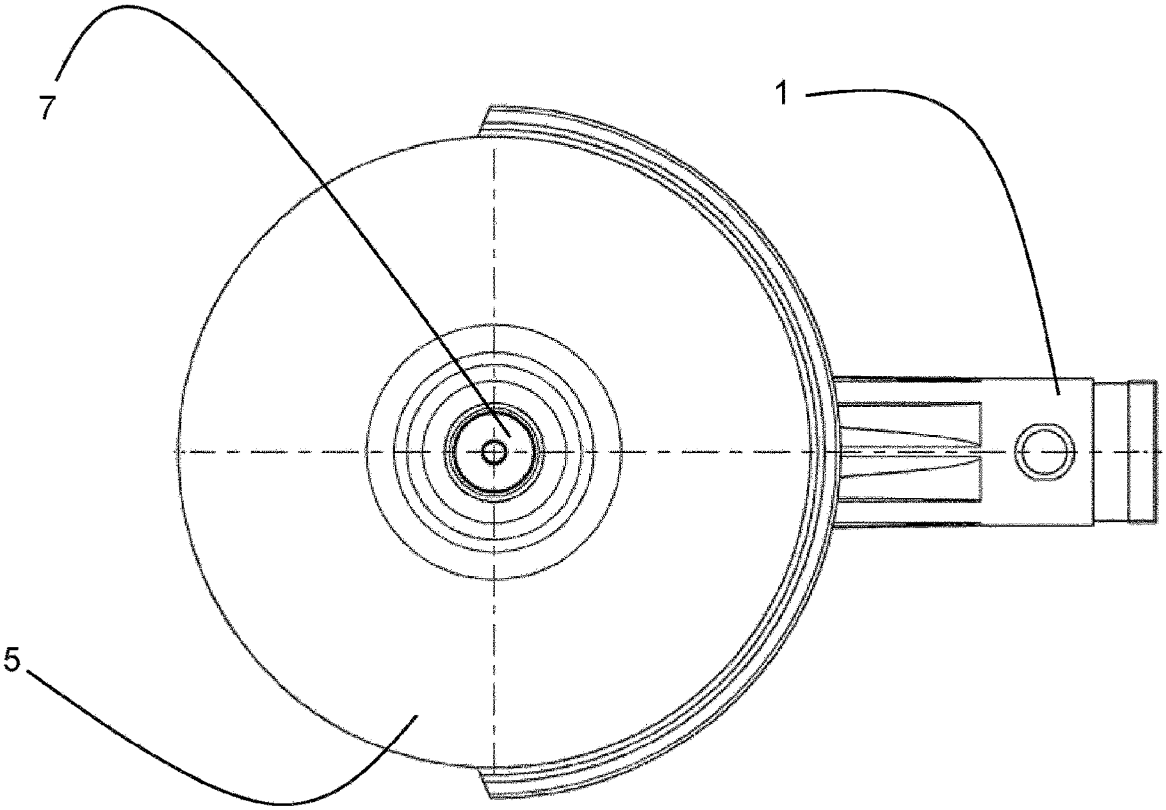
FIG. 4 shows a bottom view of a hand-held tool according to the embodiment in FIG. 2.
Figure 5:
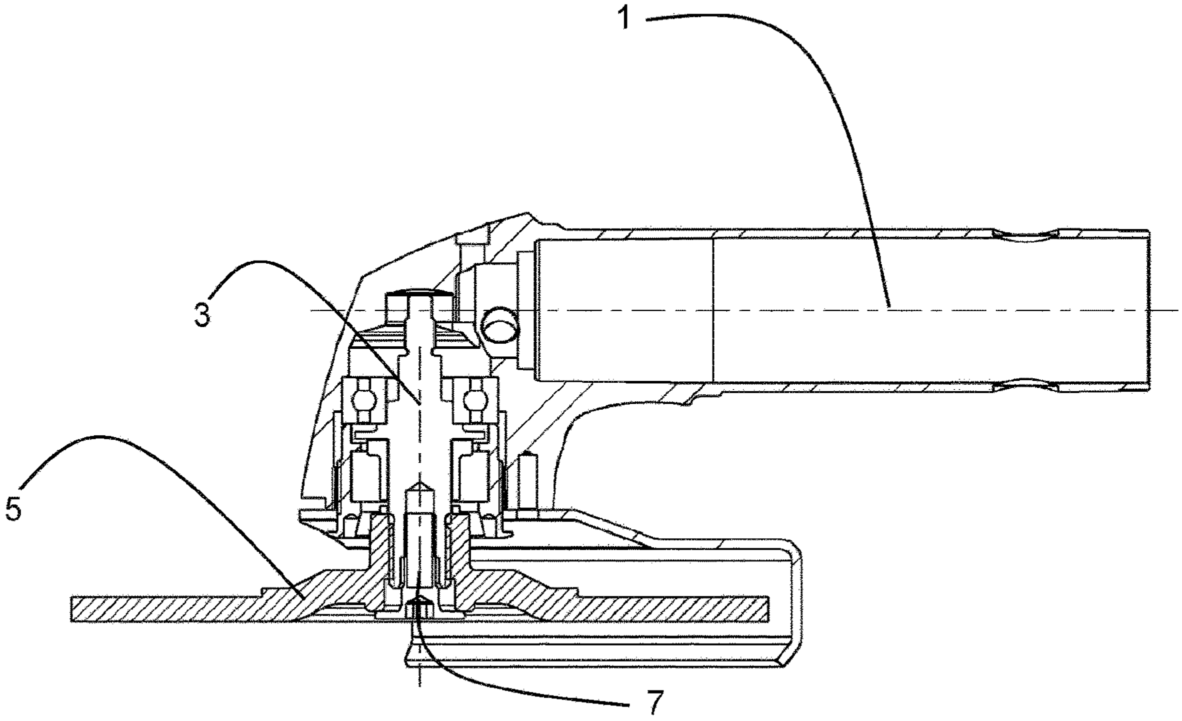
FIG. 5 shows a lateral sectional view of a hand-held tool according to the embodiment in FIG. 2.
Figure 6:
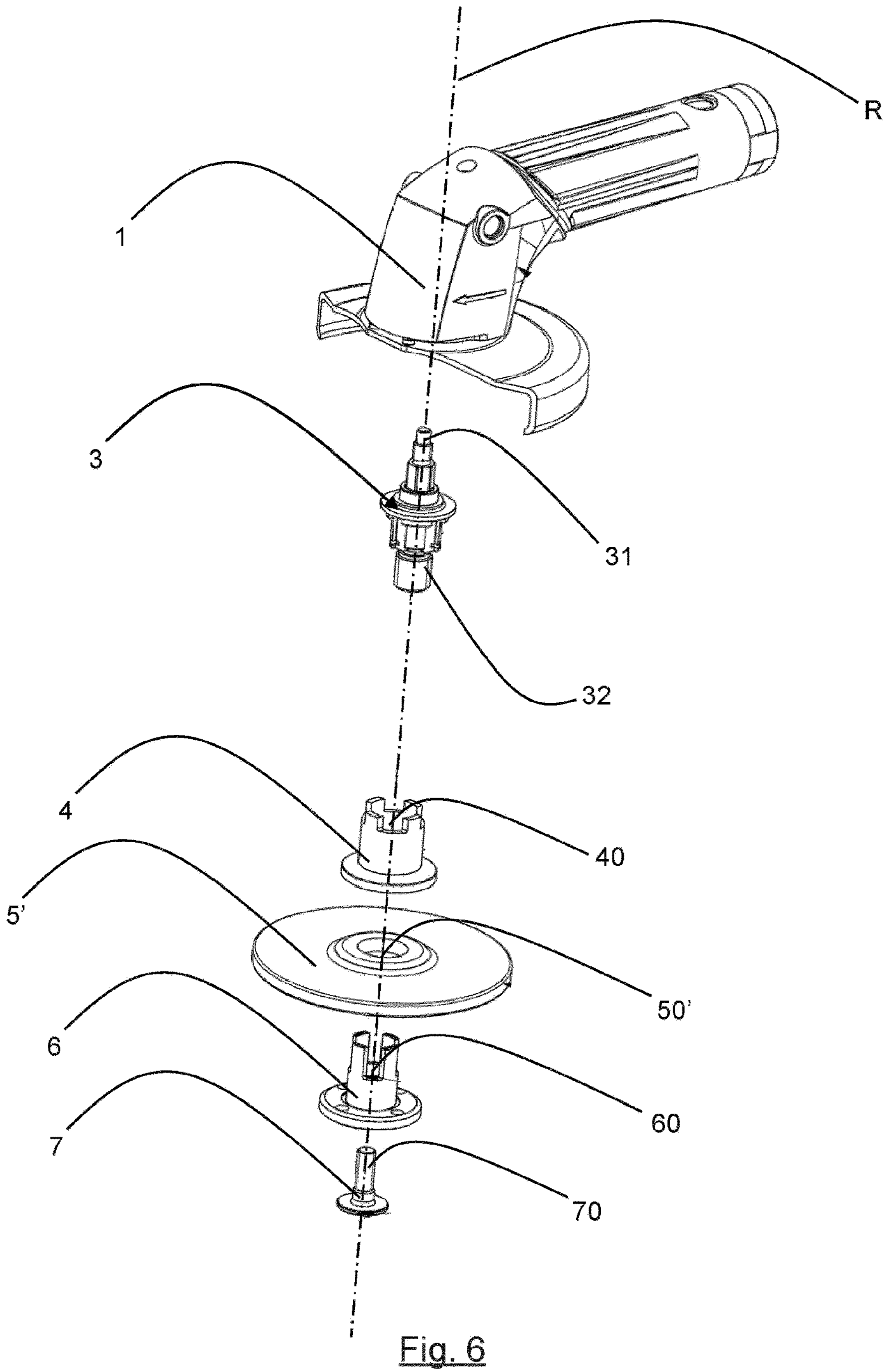
FIG. 6 shows a perspective view of a hand-held tool according to a second embodiment of the invention.

An output shaft 3 according to one embodiment is now presented with reference to FIG. 1.

As shown in this figure, the output shaft 3 has:

- an end portion 32 supporting first means for rigidly connecting the first type of accessory having a threaded central opening;
- an intermediate portion 30 supporting second means for rigidly connecting the second type of accessory having a smooth central opening; and
- an end 31 opposite the end portion 32 and linked with a transmission allowing the motor to rotate said output shaft.

In other words, the output shaft 3 is, in this case, formed by an intermediate portion 30 separating the end portion 32 and the end 31.

More particularly, in the embodiment shown, the end portion 32 has a cylindrical profile formed along the axis R and provided with an external thread forming the first means for rigidly connecting, these first means for rigidly connecting being capable of cooperating with the threaded central opening of the first type of accessory.

This end portion 32 further has a threaded hole so that it can cooperate with a locking screw of the hand-held tool.

The second means for rigidly connecting of the output shaft 3 comprise, in this embodiment, a shoulder 34 extending around the periphery of the intermediate portion 30.

In other words, the shoulder 34 forms a one-piece ring with the output shaft and in this case extends around the entire periphery of the output shaft, thus forming a stop.

The second means for rigidly connecting further comprise first toothings 33 formed on the periphery of the intermediate portion 30. These first toothings 33 are formed in the continuation of the shoulder 34 and extend in the direction of the axis of rotation R.

These second means for rigidly connecting further comprise second toothings 35 formed on the periphery of the intermediate portion 30. These second toothings 35 are formed in the continuation of the first toothings 33 and extend in the direction of the axis of rotation R.

In the embodiment shown in FIG. 1, the second toothings 35 extend as far as the end portion 32.

A first embodiment of a hand-held tool according to the invention is now presented with reference to FIGS. 2 to 5.

As shown in these figures, the hand-held tool comprises:

- a casing 1 housing a motor and a transmission;
- an output shaft 3 rotated by the motor, via the transmission, along an axis of rotation R, the output shaft 3 being capable of rotating:
  - a first type of accessory 5 having a threaded central opening 50, and
  - a second type of accessory having a smooth central opening, the output shaft 3 having:

- an end portion 32 supporting first means for rigidly connecting the first type of accessory 5;
- an intermediate portion 30 supporting second means for rigidly connecting the second type of accessory.

More particularly, in this case, the end portion 32 has a cylindrical profile formed along the axis R and is provided with an external thread forming the first means for rigidly connecting. These first means for rigidly connecting cooperate with the threaded central opening 50 of the first type of accessory 5, which thus has a profile and dimensions that complement the dimensions of the end portion 32.

The end portion 32 further has a threaded hole, and the hand-held tool comprises a locking screw 7 provided with a threaded rod 70 which is capable of cooperating with the threaded hole so as to hold the first type of accessory 5 against the output shaft 3.

In other words, the first type of accessory 5 is screwed, via the threaded central opening 50 thereof, onto the end portion 32 of the output shaft 3. The locking screw is then fitted into the threaded hole in the end portion 32 so as to clamp the first type of accessory 5 between the locking screw 7 and the end of the end portion 32 located in the continuation of the intermediate portion 30.

Such a clamping of the accessory 5 on the output shaft 3 thus allows for good transmission of the rotational motion transmitted by the motor.

The accessory 5 can, for example, be a grinding wheel with an integrated mounting nut.

It should be noted that, according to one feature of one embodiment of the invention, the locking screw has a different thread pitch to the end portion 32 of the output shaft 3.

In this way, an additional safety feature can be provided when mounting the accessory.

A second embodiment of a hand-held tool according to the invention is now presented with reference to FIGS. 6 to 9.

In this embodiment, the hand-held tool cooperates with a second type of accessory 5' having a smooth central opening 50 and implements in particular a first flange 4 and a second flange 6 so as to compensate for the absence of a threaded hole on the second type of accessory 5'.

The accessory 5' can, for example, be a grinding wheel with a mounting hole. Such a mounting hole can, for example, have a diameter between 20 mm and 25 mm, for example 22.2 mm As already described with reference to FIG. 1, the second means for rigidly connecting comprise a shoulder 34 extending around the periphery of the intermediate portion 30.

In this case, the hand-held tool comprises a first flange 4 formed around the intermediate portion 30 and bearing against the shoulder 34, which in this case forms a stop for this first flange.

Figure 7:
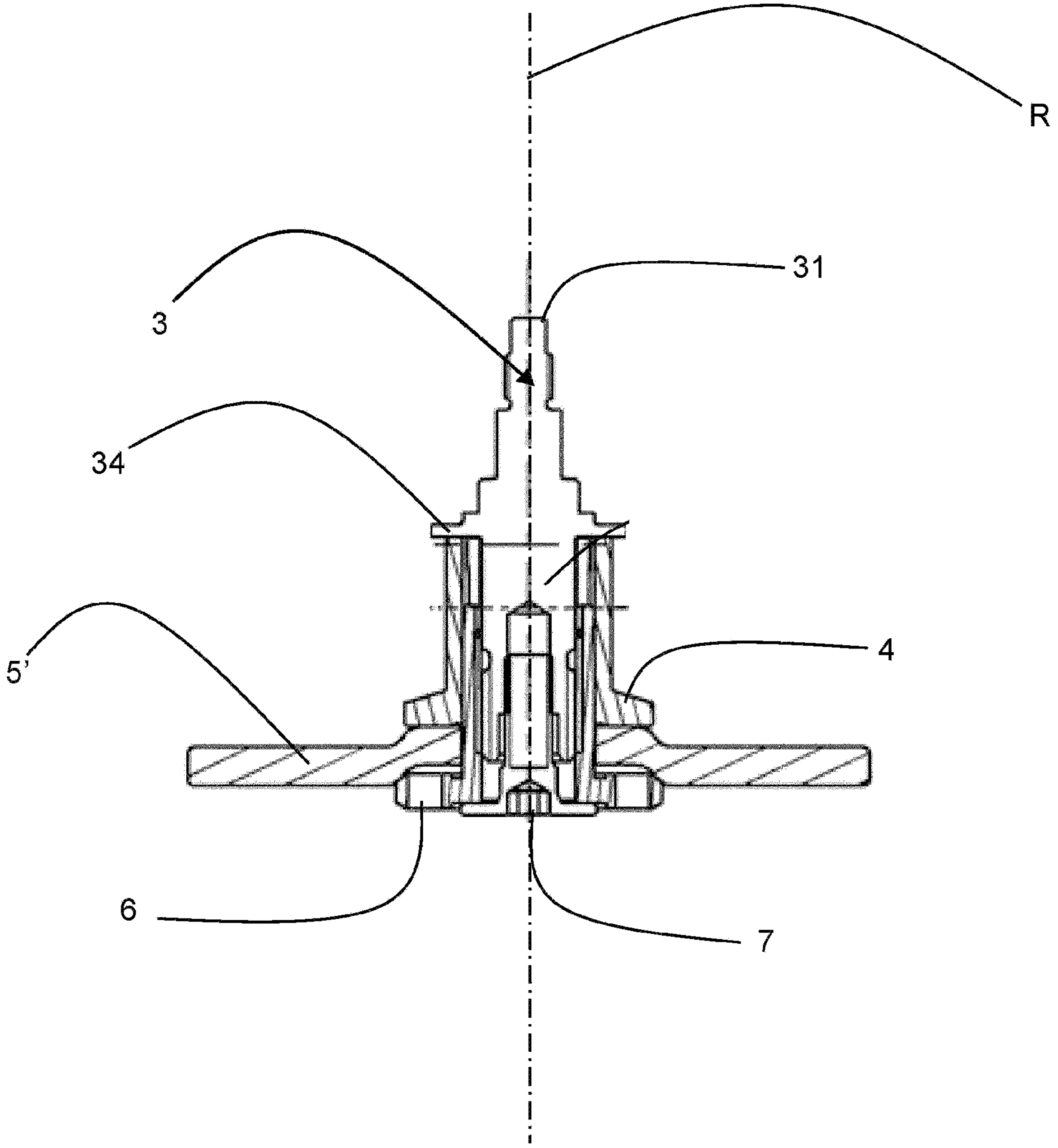
FIG. 7 shows a partial, lateral sectional view of a hand-held tool according to the embodiment in FIG. 6.
Figure 8:
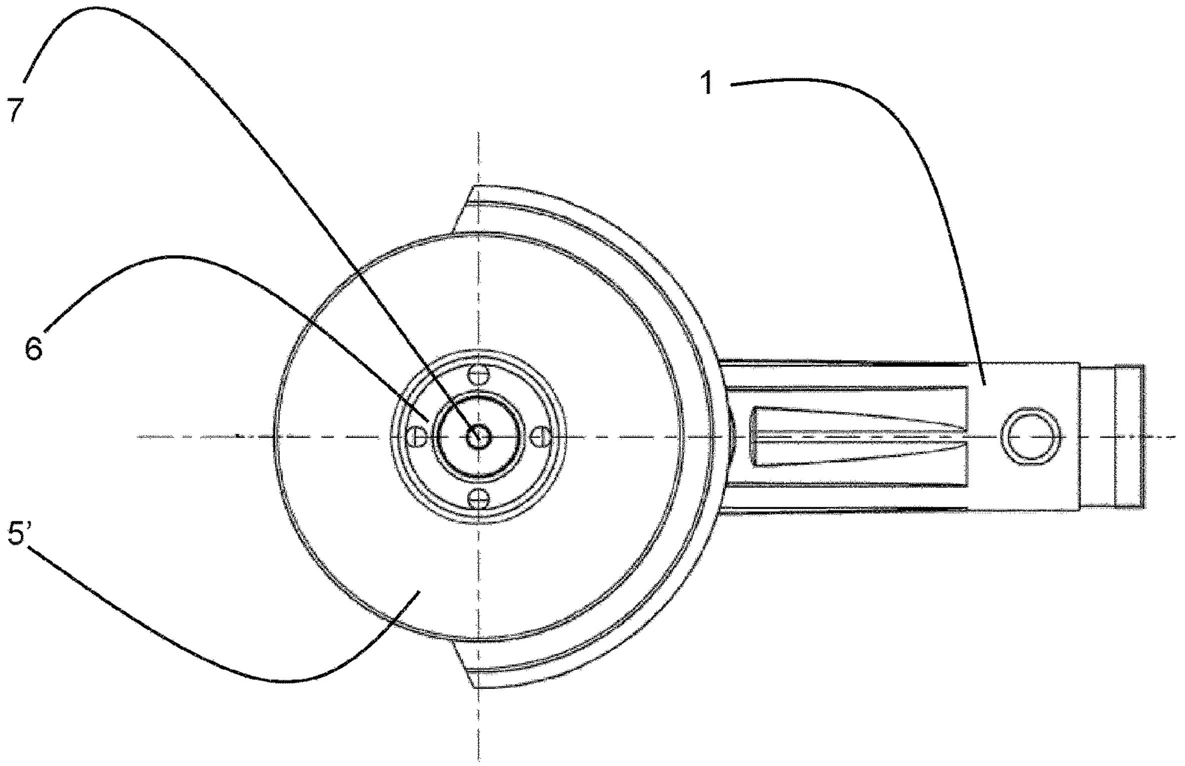
FIG. 8 shows a bottom view of a hand-held tool according to the embodiment in FIG. 6.
Figure 9:
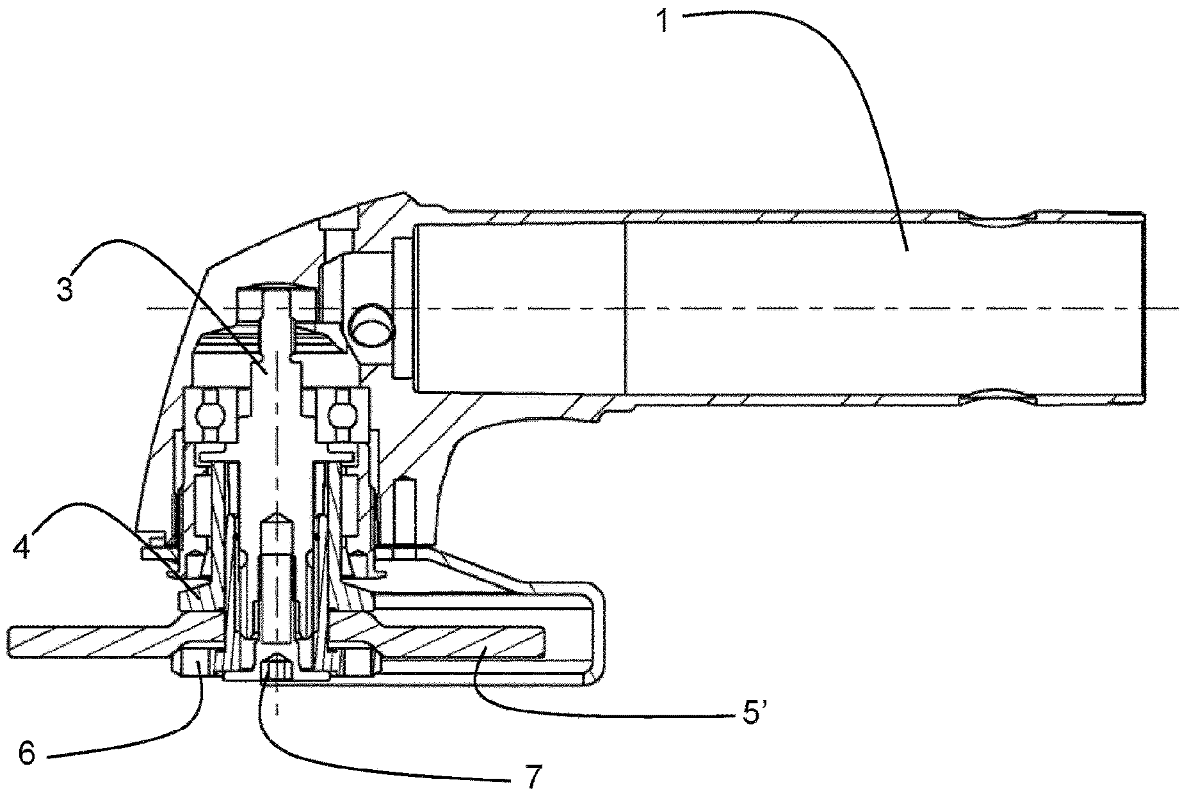
FIG. 9 shows a lateral sectional view of a hand-held tool according to the embodiment in FIG. 6.

The hand-held tool further comprises a second flange 6 formed around the intermediate portion 30 and housed between the first flange 4 and the intermediate portion 30, as shown more particularly in FIG. 7.

In this way, the first flange 4 and the second flange 6 clamp the second type of accessory 5' so as to keep this second type of accessory 5' linked to the output shaft 3.

As in the first embodiment, such a clamping of the accessory 5' on the output shaft 3 thus allows for good transmission of the rotational motion transmitted by the motor.

In order to clamp the accessory 5' in this way on the output shaft 3, the first flange 4 has a first crenelated end 40, the second means for rigidly connecting comprising, as described hereinabove, first toothings 33 formed on the periphery of the intermediate portion 30 and cooperating with the first crenelated end 40, the first toothings 33 being formed in the continuation of the shoulder 34 and extending in the direction of the axis of rotation R.

In this way, the first toothings 33 form indexing means for the first flange 4. Similarly, the second flange 6 has a second crenelated end 60, the second means for rigidly connecting comprising, as described hereinabove, second toothings 35 formed on the periphery of the intermediate portion 30 and cooperating with the second crenelated end 60. These second toothings 35 are formed in the continuation of the first toothings 33 and extend in the direction of the axis of rotation R.

In this way, the second toothings 35 form indexing means for the second flange 6.

Moreover, in this embodiment, and as shown more particularly in FIG. 7, the first flange 4 has, opposite the first crenelated end 40, a projection extending along an axis substantially orthogonal to the axis of rotation R so as to hold the second type of accessory 5' against the second flange 6.

Similarly, the second flange 6 has, opposite the second crenelated end 60, a projection extending along an axis substantially orthogonal to the axis of rotation R so as to hold the second type of accessory 5' against the first flange 4.

Moreover, and similarly to the first embodiment shown, the hand-held tool comprises a locking screw 7 cooperating with the threaded hole so as to keep the second type of accessory 5' pressed between the first flange 4 and the second flange 6.

By holding the second type of accessory 5' between the projection of the first flange 4 and the projection of the second flange 6, with the second flange 6 being housed between the first flange 4 and the intermediate portion 30, and the locking screw 7 fitted into the threaded hole of the end portion, the second type of accessory 5' is kept pressed between the first flange and the second flange and linked to the output shaft 3 so as to obtain optimal transmission of the rotational motion transmitted by the motor.

The invention claimed is:

1. A grinding or disc cutting-type hand-held tool comprising:

a casing housing a motor;

an output shaft rotatable by said motor along an axis of rotation, wherein said output shaft is capable of rotating:

a first type of accessory having a threaded central opening; and a second type of accessory having a smooth central opening, said output shaft having:

an end portion supporting a first connector element to rigidly connect said first type of accessory; and an intermediate portion supporting a second connector element to rigidly connect said second type of accessory, wherein the second connector element comprises a shoulder extending around a periphery of said intermediate portion; and wherein the grinding or disc cutting-type hand-held tool comprises:

a first flange formed around said intermediate portion and bearing against said shoulder, and a second flange formed around said intermediate portion and housed between said first flange and said intermediate portion, said first flange and said second flange being configured to clamp said second type of accessory so as to keep said second type of accessory linked to said output shaft.

2. The grinding or disc cutting-type hand-held tool according to claim 1, wherein said end portion has a cylindrical profile formed along said axis and provided with an external thread forming said first connector element, said first connector element being cooperable with said threaded central opening of said first type of accessory.

3. The grinding or disc cutting-type hand-held tool according to claim 1, wherein said end portion has a threaded hole, and said hand-held tool further comprises a locking screw cooperable with said threaded central opening so as to hold said first type of accessory against said output shaft.

4. The grinding or disc cutting-type hand-held tool according to claim 1, wherein said first flange has a first crenelated end, the second connector element further comprising first toothings formed on the periphery of said intermediate portion and cooperable with said first crenelated end so as to form an index for said first flange, said first toothings being formed in a continuation of said shoulder and extending in a direction of said axis of rotation.

5. The grinding or disc cutting-type hand-held tool according to claim 4, wherein said second flange has a second crenelated end, the second connector element further comprising second toothings formed on the periphery of said intermediate portion and cooperable with said second crenelated end so as to form an index for said second flange, said second toothings being formed in a continuation of said first toothings and extending in the direction of said axis of rotation.

6. The grinding or disc cutting-type hand-held tool according to claim 4, wherein said first flange has, opposite said first crenelated end, a projection extending along an axis substantially orthogonal to the axis of rotation so as to hold said second type of accessory against said second flange.

7. The grinding or disc cutting-type hand-held tool according to claim 5, wherein said second flange has, opposite said second crenelated end, a projection extending along an axis substantially orthogonal to the axis of rotation so as to hold said second type of accessory against said first flange.

8. The grinding or disc cutting-type hand-held tool according to claim 1, wherein said end portion has a threaded hole, and said hand-held tool further comprises a locking screw cooperable with said threaded hole so as to keep said second type of accessory pressed between said first and second flanges.

9. The grinding or disc cutting-type hand-held tool according to claim 1, wherein the tool is a pneumatic or electric tool.

* * * * *